United States Patent
Browne et al.

(10) Patent No.: US 8,478,954 B2
(45) Date of Patent: Jul. 2, 2013

(54) PRIORITIZING SUBGROUPS IN A CONSISTENCY GROUP

(75) Inventors: Michael E. Browne, Staatsburg, NY (US); Nancy J. Finn, Stormville, NY (US); Christina Lara, Tucson, AZ (US); Maria R. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 12/641,512

(22) Filed: Dec. 18, 2009

(65) Prior Publication Data

US 2011/0153964 A1    Jun. 23, 2011

(51) Int. Cl.
*G06F 12/00* (2006.01)
(52) U.S. Cl.
USPC .............................. 711/162; 714/48
(58) Field of Classification Search
USPC .............................. 711/162; 714/6
See application file for complete search history.

(56) References Cited

U.S. PATENT DOCUMENTS

| | | |
|---|---|---|
| 5,440,737 A | 8/1995 | Uchinuma |
| 6,725,332 B2 | 4/2004 | Leenstra et al. |
| 7,278,049 B2 | 10/2007 | Bartfai et al. |
| 7,337,194 B2 | 2/2008 | Goyal |
| 2007/0156983 A1 | 7/2007 | Kern et al. |
| 2008/0059734 A1 | 3/2008 | Mizuno |
| 2008/0126857 A1* | 5/2008 | Basham et al. ................ 714/25 |
| 2009/0006789 A1 | 1/2009 | Lafrese |
| 2009/0222631 A1* | 9/2009 | Sugiura ........................ 711/161 |

FOREIGN PATENT DOCUMENTS

WO    WO2008121233    10/2008

\* cited by examiner

*Primary Examiner* — Reginald Bragdon
*Assistant Examiner* — Hamdy S Ahmed
(74) *Attorney, Agent, or Firm* — Steven Chiu

(57) ABSTRACT

A method which prioritizes the subgroups in a consistency group by usage and/or business process. Thereafter, in case of abnormal operation of the process for copying the consistency group from primary storage to secondary storage, only a portion of the subgroups of the consistency group are copied from primary storage to secondary storage.

12 Claims, 4 Drawing Sheets

PRIORITIZING SUBGROUPS IN A CONSISTENCY GROUP

BACKGROUND OF THE INVENTION

The present invention relates to maintaining consistency between primary storage and secondary storage when there is a deterioration of the disaster recovery link.

Disaster recovery systems typically address a sudden catastrophic failure at a single point in time. To assist in recovery of data, a copy of data may be provided at a remote location. Such dual or shadow copies are typically made as the application system is writing new data to a primary storage device. Different copy technologies well known to those skilled in the art may be used for maintaining remote copies of data at a secondary site.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. The integrity of data updates is related to insuring that updates are done at the secondary volumes in the volume pair in the same order as they were done on the primary volume.

In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. The consistency time is the latest time to which the system guarantees that updates to the secondary volumes are consistent. Consistency groups maintain data consistency across volumes and storage devices. Thus, when data is recovered from the secondary volumes, the recovered data will be consistent. For instance, if a failure occurs, the deposit will be written to the secondary volume before the withdrawal. Thus, when data is recovered from the secondary volumes, the recovered data will be consistent.

Consistency groups are formed within a session. All volume pairs assigned to a session will have their updates maintained in the same consistency group. Thus, the sessions are used to determine the volumes that will be grouped together in a consistency group.

BRIEF SUMMARY OF THE INVENTION

The present inventors have noted that the current disaster recovery protocols work in an all or nothing manner and there is no opportunity to allow business processes to influence when a failure of the disaster recovery protocol for a particular consistency group occurs. When a disaster recovery protocol failure occurs the entire consistency group stops getting updates and the whole consistency group is not usable and runs behind in time. In order to preserve the optimal recovery point objective, the entire consistency group is failed which puts the entire business at risk as there is now no recovery point. Consequently, there is a loss of disaster recovery until the problem can be resolved.

The present inventors have provided a method which may prioritize the subgroups in a consistency group by usage and/or business process. Such prioritization allows for some disks in the consistency group to fall behind and provide a warning level alert that a different recovery point objective for particular applications or jobs may need to be used. This can be the steady state until either workload on the link is reduced or a bandwidth condition is resolved. Once the disks catch up again an alert can be surfaced to state the original recovery point objective can now be obtained.

An advantage to the present invention is that the all or nothing decision on recovery points can be made in light of business processes. For example, the daily update data on a set of disks can be put into a subgroup and if there is a capacity issue on the disaster recovery link, the storage controller can prioritize the subgroups that do not have a business process that will allow them to run behind over subgroups that do have a business process that allows them to run behind. Then if a disaster occurs during this window a different business process can be used for recovery such as rerun all the daily jobs but still maintain a service for new transactions.

The various advantages and purposes of the present invention as described above and hereafter are achieved by providing, according to a first aspect of the invention, a method of utilizing subgroups in a consistency group which includes, responsive to input from a system administrator, defining a consistency group in a primary storage, responsive to input from a system administrator, defining a plurality of subgroups in the consistency group in the primary storage, and prioritizing by a computer processor the subgroups for copying according to a business process.

According to a second aspect of the invention, there is provided a method of utilizing a plurality of subgroups formed in a consistency group in primary storage which includes prioritizing by a computer processor the subgroups for copying according to a business process, and copying by a computer processor at least one subgroup but less than all of the subgroups in the consistency group to a secondary storage.

According to a third aspect of the invention, there is provided a computer program product for utilizing a plurality of subgroups in a consistency group in primary storage, the computer program product includes a computer readable storage medium having computer readable program code embodied therewith. The computer readable program code includes computer readable program code configured to prioritize the subgroups for copying according to a business process, and computer readable program code configured to copy at least one subgroup but less than all of the subgroups in the consistency group to a secondary storage.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
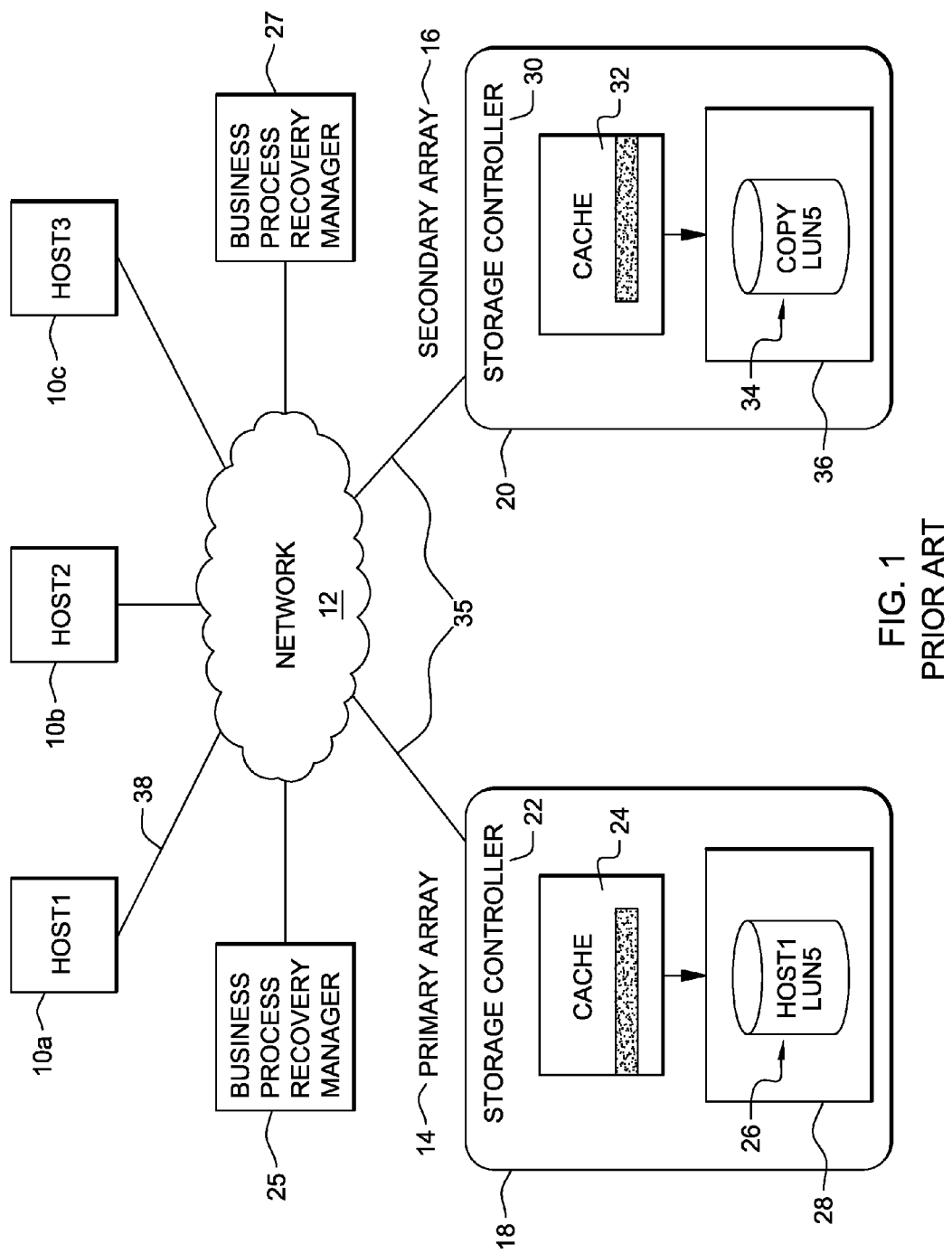
FIG. 1 is an illustration of a conventional network computing environment.

Referring to the drawings in more detail, and particularly referring to FIG. 1, there is shown a conventional network computing environment. A plurality of computers or hosts 10a, 10b, 10c are connected by links 38 to network 12 and then by link 35 to a primary array 14 of storage systems. The network 12 may be any known network such as a SAN (storage area network), LAN (local area network), internet, intranet, etc. One of the storage systems 18 that make up the primary array 14 is shown in FIG. 1. The network further includes a secondary array 16 of storage systems, one of which is storage system 20. Secondary array 16 may also be connected to network 12 by link 35. Depending on the architecture of the network computing environment, secondary array 16 may also be linked to hosts 10a, 10b, 10c. Storage systems 18, 20 are representative of storage systems in primary array 14 and second array 16, respectively.

Storage system 18 includes a storage controller 22 which manages the input/output of access to volumes 26. Volumes 26 may also be referred to as logical unit numbers (LUNS). One such volume is shown in storage system 18 as LUN5. Storage controller 22 also copies data to a corresponding secondary storage controller 30 in storage system 20 via links 35 and network 12. Storage controller 30 stores the data in volumes 34, one of which is shown as LUN5.

It should be understood that primary array 14 and secondary array 16 may be close by or may be separated by hundreds or thousands of miles. Preferably secondary array 16 is remote from primary array 14 which facilitates the recovery of data in the event of an event which may shut down or destroy hosts 10a, 10b, 10c and primary array 14.

Storage system 18 may further include a cache 24. In operation, a write block that comes in to storage system 18 is sent to cache 24 by storage controller 22 which is then written to an appropriate volume in volumes 26. Storage system 20 similarly has cache 32 for performing the same function as cache 24.

The volumes 26 in storage system 18 may be defined by a system administrator, the storage controller or a predetermined protocol into one or more consistency groups. One such consistency group 28 is shown in storage system 18. There may be several consistency groups in each storage system. Storage system 20 has a corresponding consistency group 36. Any updates to consistency group 28 are copied to consistency group 36. Each volume in consistency group 28 forms a replication pair with a corresponding volume in consistency group 36.

Figure 2:
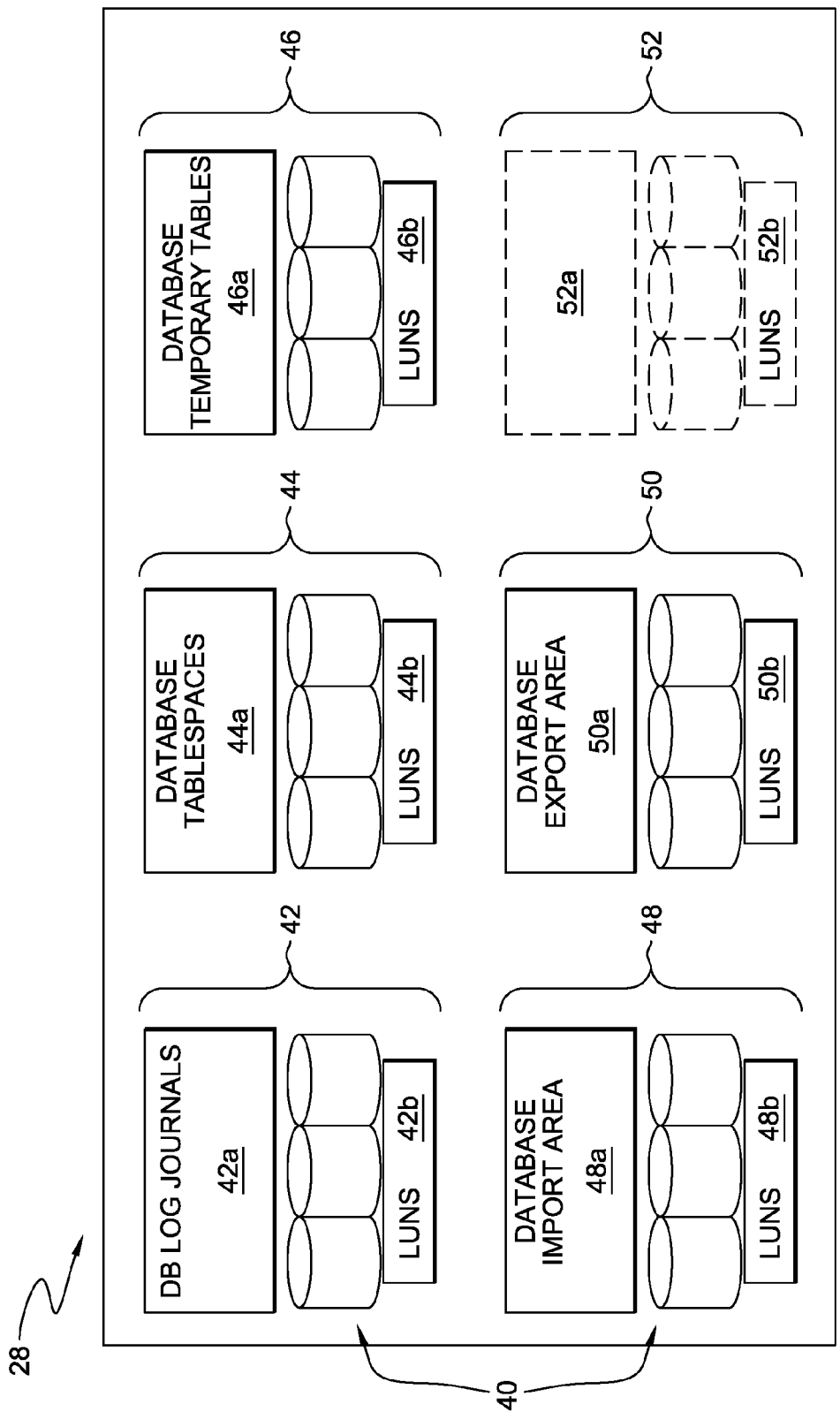
FIG. 2 is an illustration of a consistency group.

Consistency group 28 is shown in more detail in FIG. 2. Referring now to FIG. 2, consistency group 28 is divided into subgroups, generally indicated by 40. The subgroups 40 comprise database areas of the consistency group 28 and their associated LUNS. Some of the subgroups 40 include database log journals 42a, database tablespaces 44a, database temporary tables 46a, database import area 48a and database export area 50a having their associated LUNS 42b, 44b, 46b, 48b, and 50b, respectively. Together, these database areas 42a, 44a, 46a, 48a and 50a and associated LUNS 42b, 44b, 46b, 48b, and 50b make up subgroups, 42, 44, 46, 48, and 50. It should be understood that consistency group 28 may comprise other subgroups as indicated by subgroup 52 comprising database area 52a and associated LUNS 52b, drawn in phantom. Each of the database areas 42a, 44a, 46a, 48a and 50a will receive writes to their respective LUNS 42b, 44b, 46b, 48b, and 50b at various rates. All of the LUNS 42b, 44b, 46b, 48b, and 50b are typically placed in a single consistency group so when they are replicated, the entire set of LUNS can be accessed at once.

Referring back to FIG. 1, the operation of the conventional network computing system will be described in more detail. Host 1 10a has a write block which is sent by link 38 to network 12 which, in turn, is sent by link 35 to primary array 14 and in particular storage system 18. Storage controller 22 directs the write block to cache 24 which then writes it to, for example, LUN5 in consistency group 28. Storage controller 22 may schedule, according to one protocol, consistency group 28 for replication (also referred to as copying) at predetermined times or intervals. Cache 24 sends updates from consistency group 28 up link 35, through network 12 and down link 35 to storage system 20. Storage controller 30 receives the updates into cache 32 which are then written into consistency group 36 and particularly LUN5. LUN5 in consistency group 28 and LUN5 in consistency group 36 are said to be a replication pair.

When the predetermined time or interval for replication has occurred, the entire consistency group 28 is replicated to consistency group 36 even though there may not be updates to all volumes in consistency group 28. When the links 35 between the primary array 14 and secondary array 16 deteriorate due to, for example, capacity issues or problems with the network 12, the consistency group 28 may be unable to provide updates to consistency group 36, thereby causing consistency group 36 to fall behind and ultimately become useless. That is, the conventional methodology is for the entire consistency group in primary storage to replicate so if the entire consistency group cannot be replicated because of the above problems, the corresponding consistency group in secondary storage falls behind. This puts the entire business at risk as there is now no recovery point and a consequent loss of disaster recovery until the problem can be resolved.

In the present invention, the subgroups 40 are all in a single consistency group 28 that would under normal conditions be treated as one consistency group. The subgroups 40 are prioritized according to usage type and business process. A prioritization scheme may include, for example, prioritizing temporary data lower than permanent data and export data lower than import data such that the business recovery actions may be to rerun the business process with the input data again to recreate the output data. When replication conditions deteriorate and the storage controller 22 determines that it may not be able to keep up in the near future, a particular subgroup or subgroups may be dropped out of the consistency group 28 and removed from replication which should hopefully relieve the deteriorating replication condition. The storage controller 22 selects a particular subgroup or subgroups based on the ability of a business recovery process being available to be able to handle the loss of that group on the replication target side (i.e, consistency group 36 in storage system 20). This allows storage system 18 to continue with updates without performance penalty and the entire consistency group 28 does not have to be shutdown.

Storage controller 22, at detection of the deteriorating replication condition, requests from a business process recovery manager 25 which subgroups 40 can be dropped from the consistency group 28 based on the current business process state. A business process recovery manager 25 is a business process workflow engine that is commonly a server with an operating system and business process workflow software installed on it. Those practiced in the art of business process workflow automation would find this type of service common. The workflow has defined in it relationships between business process and LUNS associated with sub groups and process flows to follow when a particular subgroup of LUNS becomes unavailable, and then subsequently available. There is a corresponding business process recovery manager 27 on the secondary storage side of the network.

The storage controller 22 is configured to know which consistency groups are associated with each business process recovery manager, what the subgroup relationships are to the consistency group and the LUNS associated with the subgroup.

Once the business process recovery manager 25 determines the subgroup 40 that can be dropped from the consistency group 28 for purposes of replication, the storage controller 22 can analyze the current LUNS targets in cache 24 and determine if dropping that sub group 40 will improve the condition. If those LUNS in the returned subgroup 40 do not have any outstanding writes in the cache 24, then dropping that subgroup 40 will not improve the situation. In this case the storage controller 22 can make an additional request to the business process recovery manager 25 for a subgroup to drop for purposes of replication.

As an illustration and referring to FIGS. 1 and 2 together, in the case of storage system 18, a deteriorating condition is detected. The storage controller 22 would request a subgroup 40 from the business process recovery manager 25. If subgroup 50 was returned to the storage controller 22, the storage controller 22 would analyze cache 24 to see if any outstanding write blocks are in cache 24 for LUNS 50*b* that have not been replicated. If there were not any outstanding write blocks for LUNS 50*b* (for instance the work on the database has not created any output yet), the storage controller 22 would then make a request from the business process recovery manager 25 for another subgroup 40 to drop from the replication. The response might be subgroup 48. The storage controller 22 may then analyze cache 24 and determine if there are any outstanding write blocks for LUNS 48*b* that have yet to be replicated. If there are, the storage controller 22 may drop LUNS 48*b*, provided there is a business process that allows subgroup 48*b* to run behind. Business process recovery manager 25 makes the determination of whether subgroup 48*b* (or any other subgroup) is allowed to run behind, that is, to replicate at a time later than other subgroups. The process continues until a subgroup 40 is found that has outstanding write blocks that can be removed from the consistency group 28 as determined by the business recovery manager.

Figure 3:
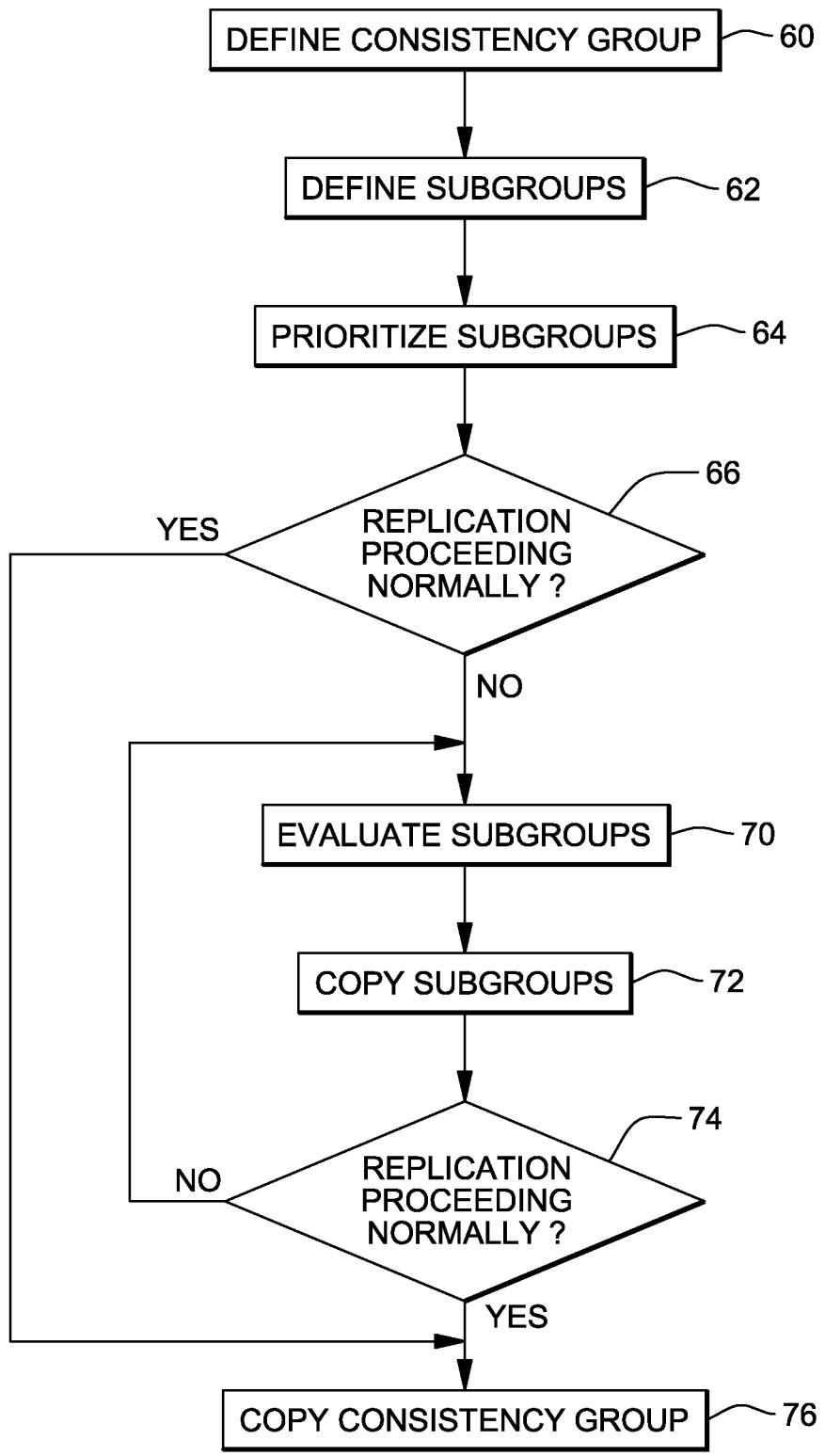
FIGS. 3 and 4 are block diagrams illustration the method according to the present invention.

Referring now to FIG. 3, the method of the present invention is described in more detail. In block 60, the consistency groups are defined in each storage system, for example, consistency group 28 in storage system 18 and consistency group 36 in storage system 20. The consistency groups may be defined by a system administrator, storage controller or predetermined protocol.

Next, in block 62, the subgroups of the consistency groups are defined, for example, subgroups 40 in consistency group 28. The consistency subgroups may be defined by a system administrator, storage controller or predetermined protocol.

The subgroups are prioritized as indicated by block 64. Prioritization may occur by usage type and business process as described previously.

The storage controller determines if replication of the storage system is proceeding normally or abnormally, as indicated in block 66. The storage controller may detect whether the link through the network to the secondary storage is functional and how much data has been sent over the network in a given time. The storage controller analyzes whether the cache is filling up with write blocks queued to copy to the secondary array. If the cache is filling up with write blocks, this is an indication that the link may not be working properly or that there is a capacity issue, further indicating that replication is proceeding abnormally. Replication slows to the point that subgroups may have to be dropped, for example when one of the replication links might be encountering temporary errors over a longer period of time which will force retransmissions for every error and result in reduced total bandwidth. In general, an abnormal condition may be detected by the amount of cache utilization, reduction in link bandwidth rates, or numbers of writes in arrears. If replication is proceeding normally, the consistency group as a whole is copied (i.e., replicated) to secondary storage, block 76. If replication is proceeding abnormally, then the process proceeds to block 70.

Figure 4:
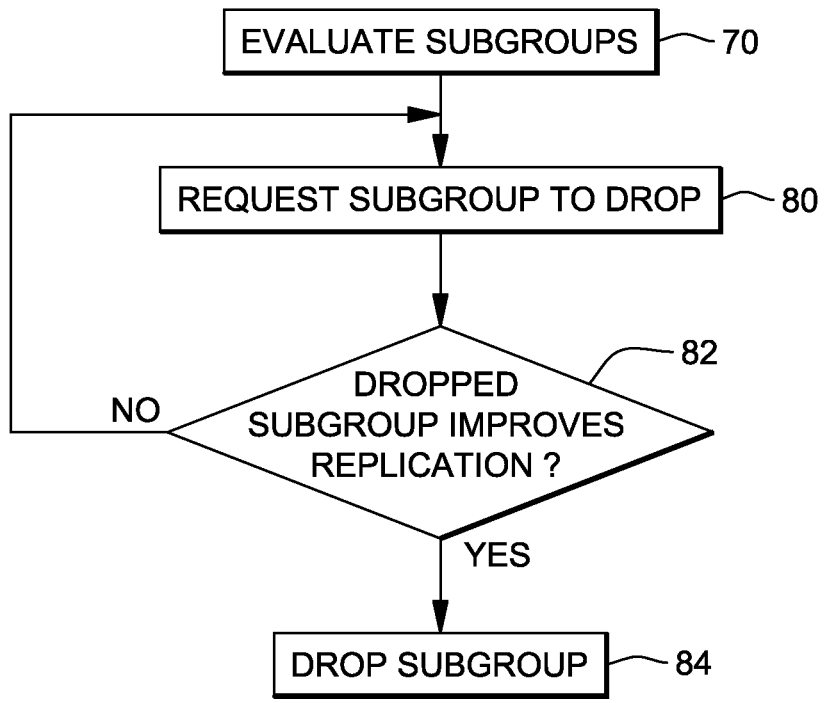

In block 70, the subgroups are evaluated to determine a subgroup or subgroups which can be dropped from replicating the consistency group. The process of evaluating the subgroups is discussed in more detail with respect to FIG. 4. In block 80 of FIG. 4, the storage controller requests from the business process recovery manager at least one subgroup which may be dropped. The business process recovery manager returns to the storage controller at least one subgroup which may be dropped.

The storage controller determines if the returned subgroup is dropped, would that improve the condition that caused the replication to proceed abnormally, as indicated in block 82. If so, the subgroup is dropped from replication, block 84. If not, the process loops back to requesting at least one subgroup to drop, block 80. The process continues until there is at least one subgroup to drop and the condition that caused the replication to proceed abnormally is improved.

Returning now to FIG. 3, one or more subgroups have been dropped from the consistency group for purposes of replication and the condition that caused replication to proceed abnormally has been improved. The remaining subgroups in the consistency group are then copied to secondary storage, for example, into consistency group 36, block 72.

Again, the storage controller determines if the replication is proceeding normally by checking the cache level, as indicated in block 74. If the cache level is low enough, the entire consistency group in primary storage (for example, consistency group 28) is copied into the corresponding consistency group in secondary storage (for example, consistency group 36). A new recovery point will then be set for the entire consistency group in primary storage. If the storage controller determines that replication is proceeding abnormally as indicated by an insufficiently low cache level, the process loops back to evaluating subgroups to find another subgroup to drop from replication, block 70. The process keeps looping back to block 70 until replication is proceeding normally as indicated by a low cache level.

Figure 5:
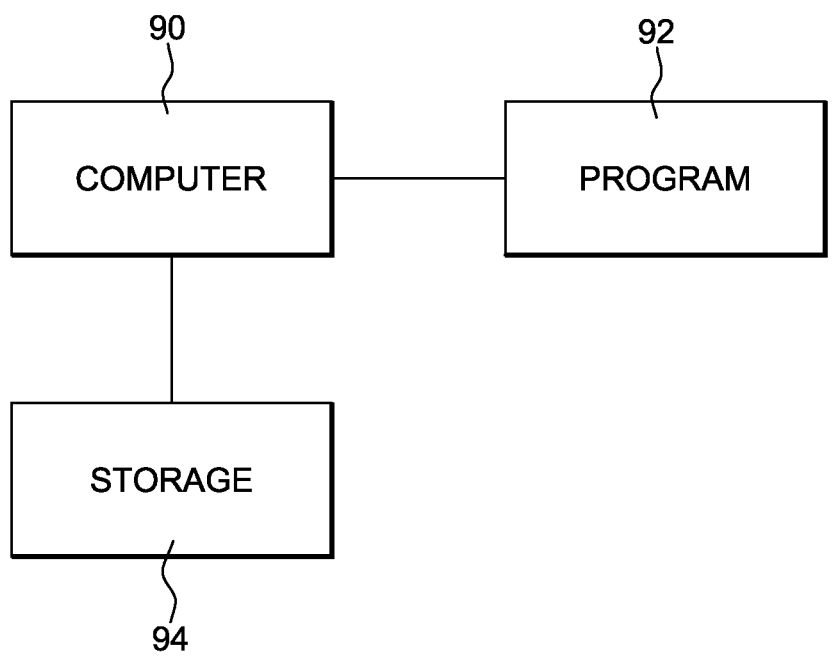
FIG. 5 is an exemplary hardware environment of the present invention.

FIG. 5 is a block diagram that illustrates an exemplary hardware environment of the present invention. The present invention is typically implemented using a computer 90 comprised of microprocessor means, random access memory (RAM), read-only memory (ROM) and other components.

The computer may be a personal computer, mainframe computer or other computing device. Resident in the computer 90, or peripheral to it, will be a storage device 94 of some type such as a hard disk drive, floppy disk drive, CD-ROM drive, tape drive or other storage device.

Generally speaking, the software implementation of the present invention, program 92 in FIG. 5, is tangibly embodied in a computer-readable medium such as one of the storage devices 94 mentioned above. The program 92 comprises instructions which, when read and executed by the microprocessor of the computer 90 causes the computer 90 to perform the steps necessary to execute the steps or elements of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above in with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of this invention beyond those embodiments specifically described here may be made without departing from the spirit of the invention.

Accordingly, such modifications are considered within the scope of the invention as limited solely by the appended claims.

We claim:

1. A method of utilizing subgroups in a consistency group comprising the steps of:
  responsive to input from a system administrator, defining a consistency group in a primary storage comprising a first grouping of logical storage volumes and defining a corresponding consistency group in a secondary storage comprising a second grouping of logical storage volumes such that updates to the primary storage consistency group are copied to the secondary storage consistency group in the same order they were made to the primary storage consistency group;
  responsive to input from a system administrator, defining a plurality of subgroups in the consistency group in the primary storage and a corresponding plurality of subgroups in the secondary storage;
  copying by a computer processor the entire primary storage consistency group to the corresponding secondary storage consistency group;
  detecting by a storage controller an abnormal condition in a process for copying the entire consistency group from primary storage to the corresponding consistency group in secondary storage, the abnormal condition preventing the entire primary storage consistency group from being copied in a timely manner to the corresponding secondary storage consistency group;
  responsive to the detecting of the abnormal condition, prioritizing by a computer processor the subgroups for copying from the primary storage consistency group to the second storage consistency group according to a business process to improve the abnormal condition; and
  responsive to the detecting of the abnormal condition, copying by a computer processor at least one subgroup but less than all of the subgroups in the primary storage consistency group to a corresponding at least one subgroup but less than all of the subgroups in the secondary storage consistency group.

2. The method of claim 1 further comprising the step of:
  responsive to the detecting of the abnormal condition, evaluating the plurality of subgroups to determine at least one subgroup to drop from copying to the corresponding consistency group in secondary storage.

3. The method of claim 2 wherein the step of evaluating comprising:
  requesting by the storage controller from a business process recovery manager which subgroups in the consistency group in primary storage can be dropped from copying to the corresponding consistency group in secondary storage based on a current business process state;
  determining by the storage controller if dropping one or more subgroups will improve the abnormal condition; and
  if dropping one or more subgroups will improve the abnormal condition, then dropping by the storage controller at least one subgroup from the consistency group in primary storage and if dropping one or more subgroups will not improve the abnormal condition, then repeating the step of requesting.

4. The method of claim 1 further comprising the steps of:
  subsequent to the detecting of the abnormal condition, detecting by the storage controller that the process for copying the consistency group from primary storage to the corresponding consistency group in secondary storage is proceeding normally; and
  copying by a computer processor the entire consistency group from primary storage to the corresponding consistency group in secondary storage.

5. The method of claim 1 wherein the abnormal condition comprises a reduced capacity to copy the entire consistency group from primary storage to the corresponding consistency group in secondary storage.

6. The method of claim 1 wherein the abnormal condition may be detected by an amount of cache utilization, a reduction in link bandwidth rates or numbers of writes in arrears.

7. A computer program product for utilizing a plurality of subgroups in a consistency group in primary storage, the computer program product comprising:
  a nontransitory computer readable storage medium having computer readable program code embodied therewith, the computer readable program code comprising:
  computer readable program code to define a consistency group in a primary storage comprising a first grouping of logical storage volumes and to define a corresponding consistency group in a secondary storage comprising a second grouping of logical storage volumes such that updates to the primary storage consistency group are copied to the secondary storage consistency group in the same order they were made to the primary storage consistency group;
  computer readable program code configured to define a plurality of subgroups in the consistency group in the primary storage and a corresponding plurality of subgroups in the secondary storage;
  computer readable program code to copy the entire primary storage consistency group to the corresponding secondary storage consistency group;
  computer readable program code to detect an abnormal condition in a process for copying the entire consistency group from primary storage to the corresponding consistency group in secondary storage, the abnormal condition preventing the entire primary storage consistency group from being copied in a timely manner to the corresponding secondary storage consistency group;
  responsive to the detection of the abnormal condition, computer readable program code configured to prioritize the subgroups for copying from the primary storage consistency group to the secondary storage consistency group according to a business process to improve the abnormal condition; and
  responsive to the detection of the abnormal condition, computer readable program code configured to copy at least one subgroup but less than all of the subgroups in the primary storage consistency group to a corresponding at least one subgroup but less than all of the subgroups in the secondary storage consistency group.

8. The computer program product of claim 7 further comprising:
  responsive to the detection of the abnormal condition, computer readable program code configured to evaluate the plurality of subgroups to determine at least one subgroup to drop from copying to the corresponding consistency group in secondary storage.

9. The computer program product of claim 8 further comprising:
  subsequent to the detection of the abnormal condition, computer readable program code configured to detect that the process for copying the consistency group from primary storage to the corresponding consistency group in secondary storage is proceeding normally; and computer readable program code configured to copy the entire consistency group from primary storage to the corresponding consistency group in secondary storage.

10. The computer program product of claim 8 wherein the computer readable program code configured to evaluate comprises:

computer readable program code configured to request from a business process recovery manager which subgroups in the consistency group in primary storage can be dropped from copying to the corresponding consistency group in secondary storage based on a current business process state;

computer readable program code configured to determine if dropping one or more subgroups will improve the abnormal condition; and if dropping one or more subgroups will improve the abnormal condition, then computer readable program code configured to drop at least one subgroup from the consistency group in primary storage and if dropping one or more subgroups will not improve the abnormal condition, then computer readable program code configured to repeat the computer readable program code configured to request.

11. The computer program product of claim 7 wherein the abnormal condition comprises a reduced capacity to copy the entire consistency group from primary storage to the corresponding consistency group in secondary storage.

12. The computer program product of claim 7 wherein the abnormal condition may be detected by an amount of cache utilization, a reduction in link bandwidth rates or numbers of writes in arrears.

\* \* \* \* \*